(12) United States Patent
Xie

(10) Patent No.: US 6,382,065 B1
(45) Date of Patent: May 7, 2002

(54) REMOVABLE PULLEY WHEEL ARRANGEMENT AND ASSOCIATED BAND SAW APPARATUS

(75) Inventor: Mark Mingjun Xie, Tipp City, OH (US)

(73) Assignee: Premark FEG L.L.C., Wilmington, DE (US)

( * ) Notice: Subject to any disclaimer, the term of this patent is extended or adjusted under 35 U.S.C. 154(b) by 0 days.

(21) Appl. No.: 09/548,517

(22) Filed: Apr. 13, 2000

(51) Int. Cl.[7] .................................................. F16B 2/00
(52) U.S. Cl. ................. 83/698.41; 83/698.11; 83/666
(58) Field of Search ............................ 83/788, 698.11, 83/698.41, 666, 665

(56) References Cited

U.S. PATENT DOCUMENTS

| | | |
|---|---|---|
| 190,015 A | 4/1877 | Dwight |
| 202,312 A | 4/1878 | Warner |
| 398,274 A | 2/1889 | Ormerod et al. |
| 565,473 A | 8/1896 | Levanseler |
| 778,428 A | 12/1904 | Norris |
| 1,042,583 A | 10/1912 | Meigs |
| 1,573,216 A | 2/1926 | Zerbe |
| 2,672,380 A | 3/1954 | LeBus |
| 2,728,240 A | 12/1955 | Stahlecker |
| 3,656,393 A * | 4/1972 | Goellner .................. 83/666 |
| 3,684,245 A | 8/1972 | Marichev et al. |
| 3,902,391 A * | 9/1975 | Bond ........................ 83/788 |
| 3,908,501 A * | 9/1975 | Aizawa ..................... 83/788 |
| 3,943,810 A * | 3/1976 | Muylle ...................... 83/337 |
| 4,520,703 A * | 6/1985 | Speckhart ................. 83/478 |
| 4,572,047 A * | 2/1986 | Punater et al. ............ 83/481 |
| 4,576,505 A * | 3/1986 | Wrightson et al. ....... 403/362 |
| 4,657,428 A * | 4/1987 | Wiley ....................... 83/666 |
| 4,809,465 A * | 3/1989 | Mushardt et al. ........ 83/666 |
| 4,909,113 A * | 3/1990 | Ischenko et al. ......... 83/698 |
| 5,373,766 A * | 12/1994 | Ranly et al. .............. 83/676 |
| 5,447,086 A * | 9/1995 | Wittmaier et al. ....... 83/666 |
| 5,924,208 A * | 7/1999 | Saeki ........................ 30/388 |

* cited by examiner

*Primary Examiner*—M. Rachuba
*Assistant Examiner*—Kim Ngoc Tran
(74) *Attorney, Agent, or Firm*—Thompson Hine LLP

(57) ABSTRACT

An idler pulley wheel arrangement for a bandsaw includes a non-rotating idler shaft and an idler pulley wheel assembly positioned on the shaft for rotation relative thereto. A latch mechanism is positioned on an end of the shaft and includes a latch part connected to the end of the shaft for movement between a first position defining a latching state of the mechanism in which a portion of the latch part extends beyond an outer surface of the shaft and a second position defining a non-latching state of the mechanism in which the latch part is positioned entirely within or in substantial alignment with the outer surface of the shaft. The latch mechanism also includes a catch positioned on the end of the shaft for holding the latch part in the non-latching state such that the idler pulley wheel assembly can be slid off the end of the shaft when the latch mechanism is in the non-latching state.

18 Claims, 4 Drawing Sheets

REMOVABLE PULLEY WHEEL ARRANGEMENT AND ASSOCIATED BAND SAW APPARATUS

FIELD OF THE INVENTION

The present invention relates generally to free wheeling or idling pulley wheels and, more particularly, to a removable pulley wheel arrangement for use in a meat band saw wherein the pulley wheel is mounted on a shaft in a quick-release manner to permit simple removal for cleaning and replacement purposes.

BACKGROUND OF THE INVENTION

In the food processing industry large upright band saws such as band saw 10 of FIG. 1 are commonly used for cutting meat products of a variety of sizes. Such band saws typically include a frame 12 upon which is mounted a support surface 14 for positioning meat products to be cut. A housing portion 16 of the frame extends above support surface 14 and a housing portion 18 of the frame extends below support surface 14. A band saw blade 20 passes though a plane defined by support surface 14 and extends around pulley wheel members 22 and 24 located within housing portions 16 and 18. Pulley wheel 24 is connected to a drive mechanism for drivingly moving the band saw blade 20 as it rotates. In particular, a drive motor may be connected for rotating pulley wheel 24. Pulley wheel 22 acts as an idler wheel, rotating freely along with the blade.

One embodiment of a prior arrangement for an idler wheel is depicted in the exploded view of FIG. 2 where idler pulley wheel 22 is mounted on the end of shaft 26. Idler wheel 22 is a unitary member with a central hub 28 which defines an opening. The interior side of the hub 28 includes a slot or keyway 30 for receiving pin extensions 32 of the shaft 26. The shaft 26 is mounted to the frame 12 for rotation via assembly 34. When the wheel 22 is positioned on the end of the shaft 26 rotation of the wheel 22 caused by movement of blade 20 likewise causes the shaft 26 to rotate via inter-engagement of the slot 30 and pin extension 32. The wheel 22 is maintained on the end of the shaft 26 using a latch mechanism which is mounted to the exterior hub 28 of the wheel. The latch mechanism includes a retaining latch 36 rotatably secured to the wheel hub via a shoulder screw 38. An outwardly biased catch 40 of the spring-loaded type is also positioned in the outer surface of the hub 28 and contacts the retaining latch 36 to hold the latch in its latching state. In this regard, when in the latching state, a portion of the retaining latch 36 sits within a groove 42 positioned toward the end of the shaft to prevent the wheel 22 from being slid off the end of the shaft. As the wheel 22 and shaft 26 rotate, the retaining latch 36 and catch 40 also rotate, with a portion of the retaining latch 36 remaining in the groove 42 during rotation.

The present invention provides a new idler pulley wheel arrangement for use in food product band saws.

SUMMARY OF THE INVENTION

In one aspect of the present invention, an idler pulley wheel arrangement for a bandsaw includes a non-rotating idler shaft and an idler pulley wheel assembly positioned on the shaft for rotation relative thereto. A latch mechanism is positioned on an end of the shaft and includes a latch part connected to the end of the shaft for movement between a first position defining a latching state of the mechanism in which a portion of the latch part extends beyond an outer surface of the shaft and a second position defining a non-latching state of the mechanism in which the latch part is positioned entirely within or in substantial alignment with the outer surface of the shaft. The latch mechanism also includes a catch positioned on the end of the shaft for holding the latch part in the non-latching state such that the idler pulley wheel assembly can be slid off the end of the shaft when the latch mechanism is in the non-latching state.

In another aspect of the invention, an idler pulley wheel arrangement for a bandsaw includes a non-rotating idler shaft and an idler pulley wheel assembly positioned on the shaft. The idler pulley wheel assembly includes a pulley wheel with a central opening, a bushing positioned within the central opening, and bearings positioned between an outer surface of the bushing and an inner surface of the pulley wheel. The pulley wheel is rotatable relative to the bushing and an inner surface of the bushing contacts an outer surface of the shaft for preventing relative rotation therebetween. A latch mechanism mounted on an end of the shaft includes a latch part connected to the end of the shaft for movement between a first position defining a latching state of the mechanism in which a portion of the latch part extends beyond an outer surface of the shaft and a second position defining a non-latching state of the mechanism in which the latch part is positioned entirely within or in substantial alignment with the outer surface of the shaft.

Still a further aspect of the invention provides a band saw apparatus including a frame, a driving pulley wheel mounted for rotation on the frame, and an idler shaft extending from the frame and spaced from the driving pulley wheel, the shaft fixed in a non-rotatable state. An idler pulley wheel assembly is positioned on the shaft for rotation relative thereto and a latch mechanism is positioned on an end of the shaft. The latch mechanism includes a latch part rotatably connected to the end of the shaft and movable between a first position defining a latching state of the mechanism in which a portion of the latch part extends beyond an outer surface of the shaft and a second position defining a non-latching state of the mechanism in which the latch part is positioned entirely within or in substantial alignment with the outer surface of the shaft, wherein the idler pulley wheel assembly can be slid off the end of the shaft when the latch mechanism is in the non-latching state.

DETAILED DESCRIPTION OF THE EMBODIMENTS

Figure 1:
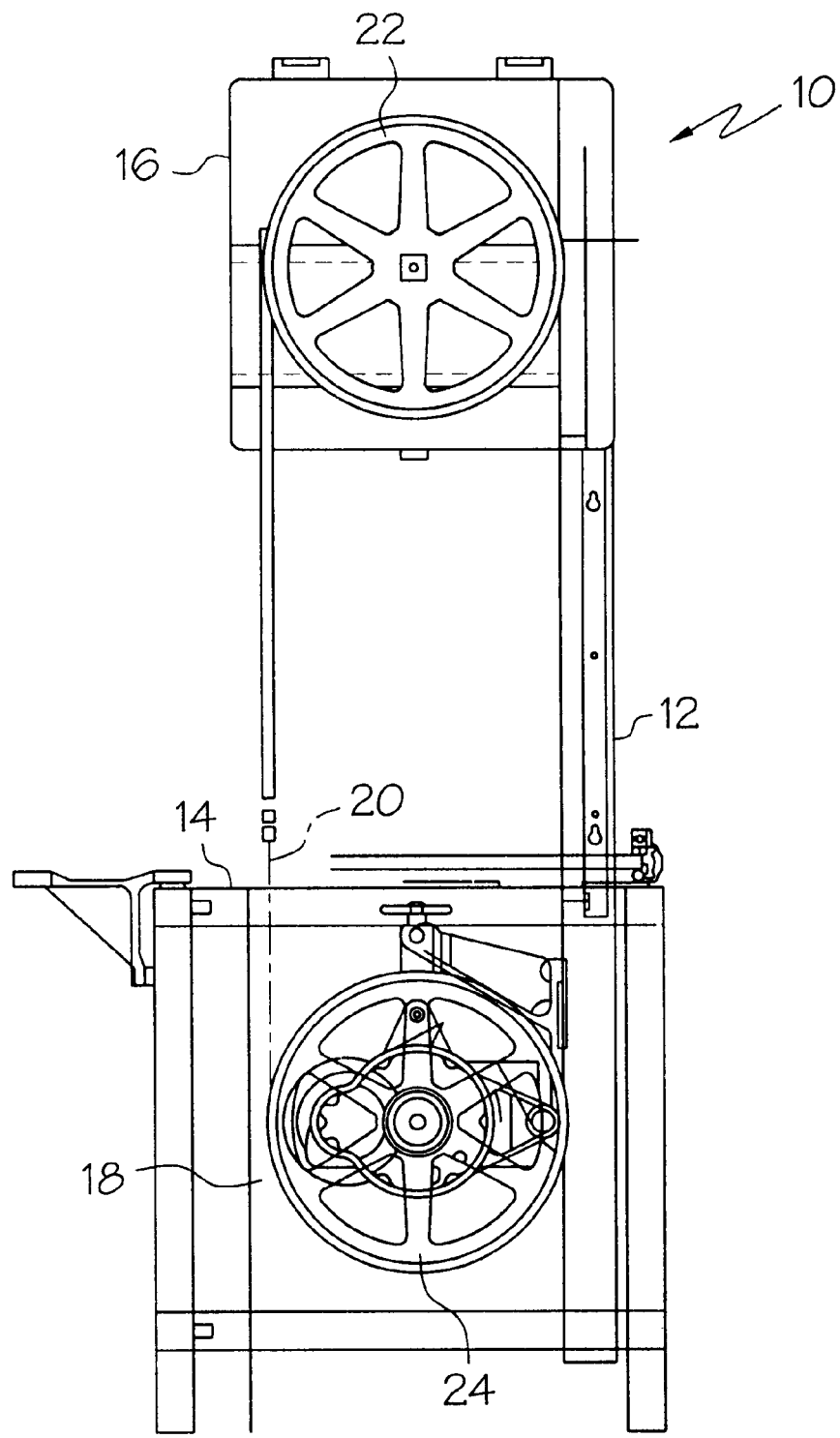
FIG. 1 is a side elevational view of a band saw apparatus.
Figure 2:
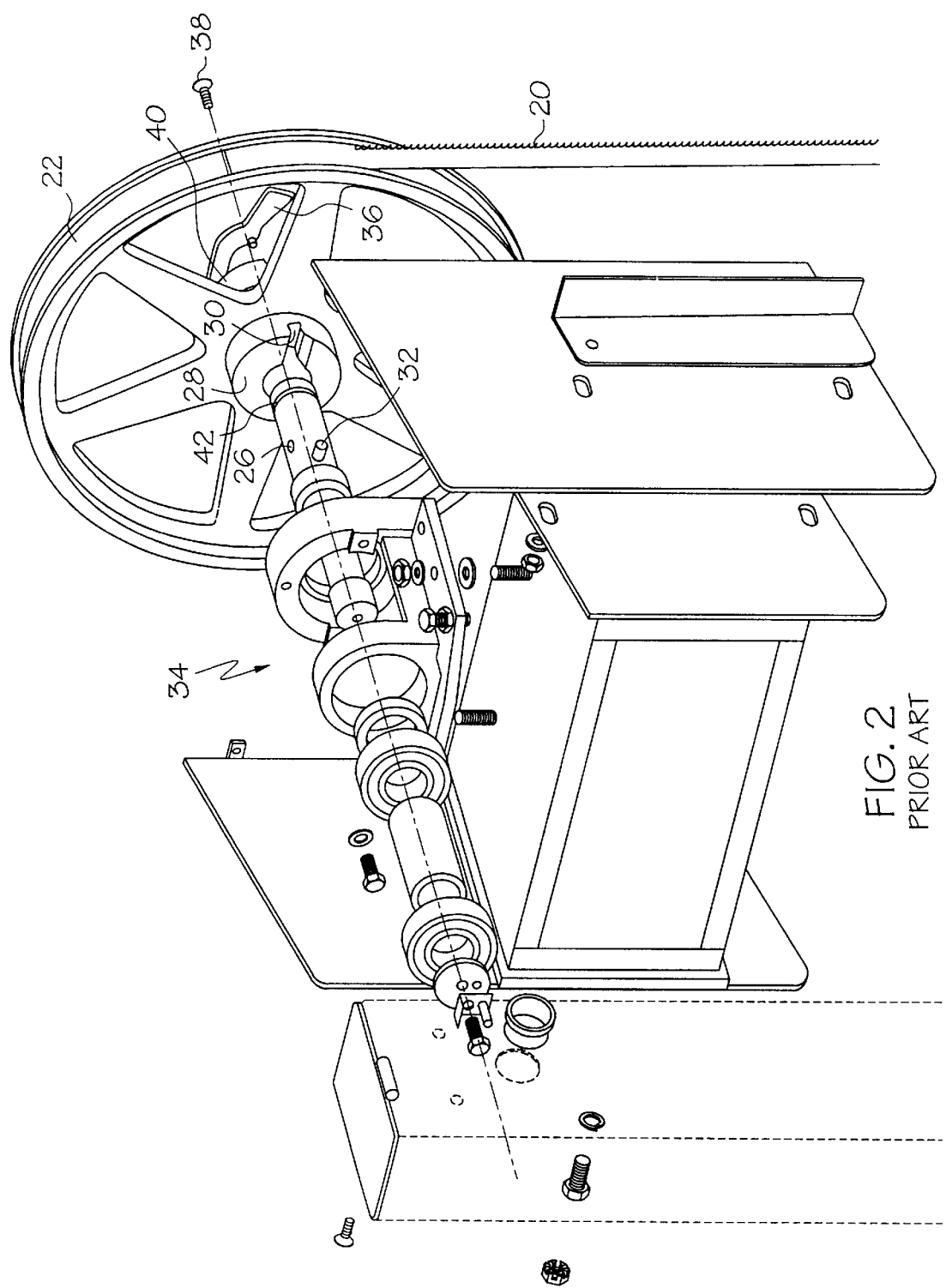
FIG. 2 is an exploded perspective view of one prior art idler pulley wheel arrangement.
Figure 3:
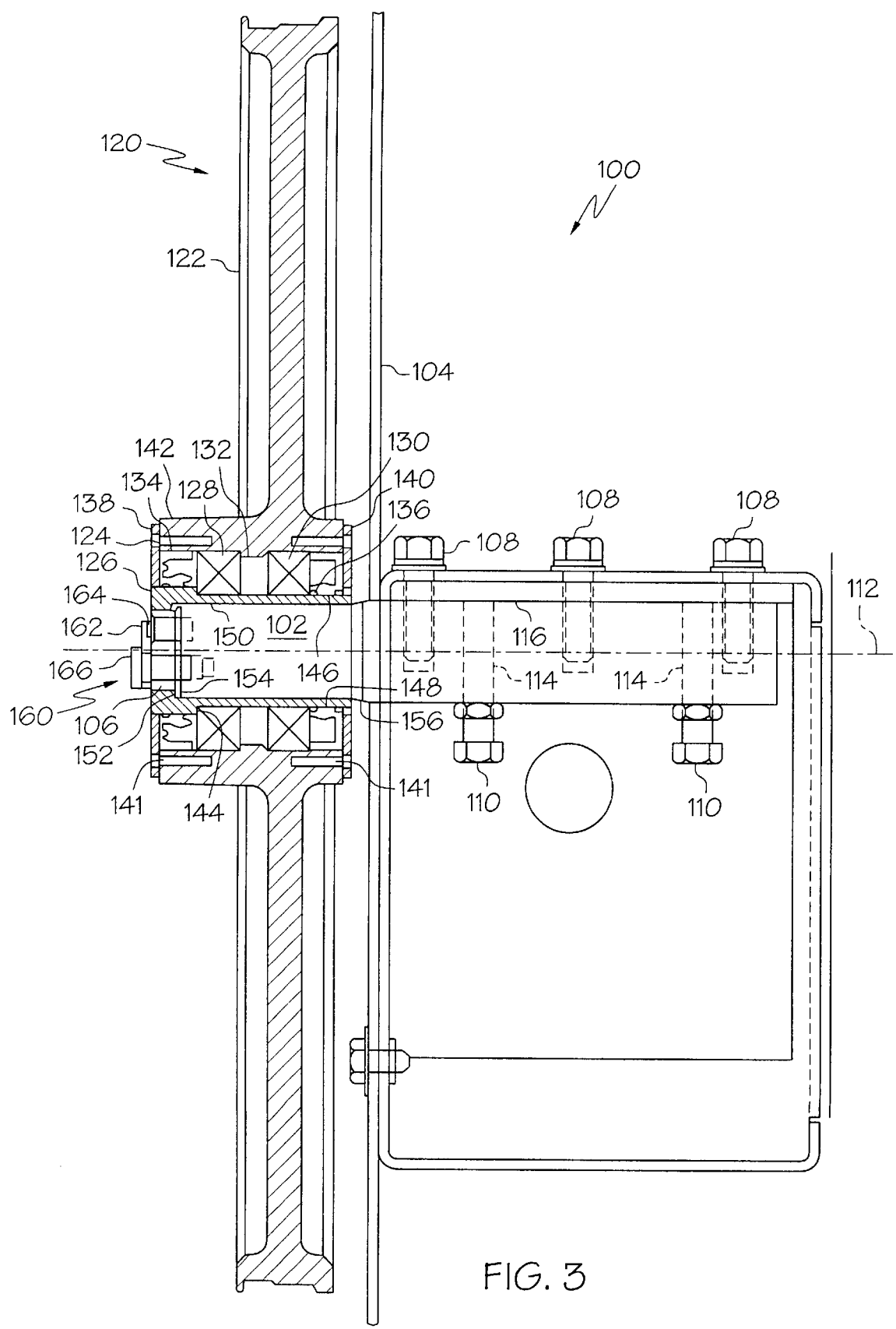
FIG. 3 is a side elevational view in partial cross-section of an idler pulley wheel arrangement in accordance with one embodiment of the present invention.

Referring to drawing FIG. 3, an idler pulley wheel arrangement 100 is shown and includes idler shaft 102 fixed to the frame housing 104 of a band saw. The shaft 102 is fixed in a non-rotating manner and includes an end 106 which extends away from the housing 104. Three screws 108 are provided for holding the shaft in place, and two screws 110 are provided for adjusting the position of the shaft. In particular, it is desirable to position the central shaft axis 112 in parallel to the similar axis of the drive wheel (not shown). Screws 110 pass completely through holes 114 which pass diametrically through the shaft 102 for abutting against a surface portion 116 of the housing 104. Rotation of the screws 110 causes the angle of the shaft 102 to vary as needed for proper alignment.

An idler pulley wheel assembly 120 is positioned on the shaft 102 for rotation relative thereto and is positioned near shaft end 106. The idler wheel assembly 120 includes an idler pulley wheel 122 having a central opening 124. A bushing 126 is positioned within the central opening and bearings 128 and 130 are positioned between the outer surface of the bushing and the inner surface of the pulley wheel 122 for enabling the pulley wheel 122 to rotate relative to the bushing 126. Ball bearings are preferred but other types of bearings such as roller bearings could be used. The inner surface of the pulley wheel includes an inwardly extending ridge 132. Bearing set 128 abuts against the outer side of the ridge and bearing set 130 abuts against the inner side of the ridge, with the inner side being defined as toward the frame housing 104 and the outer side being defined as away from the frame housing 104. A corresponding bearing seal 134 and 136 is provided for each bearing set 128 and 132 and retainer plates 138 and 140 are provided on each side of the pulley wheel hub 142 and extend partially over the central opening of the pulley wheel 122. The plates can be suitably mounted to the pulley wheel via screws (not shown) inserted into openings 141 and operate to hold the bearing seals in place.

An outer surface of the bushing 126 includes a shoulder 144 positioned to the outer side of the ridge 132 and bearing set 128 abuts against shoulder 144. Thus, bearing set 128 maintains its position via abutment against ridge 132 and shoulder 144. A groove 146 is also positioned in the outer surface of the bushing 126 to the inner side of the ridge 132 and a retainer ring 148 is positioned within the groove 146 and extends above the outer surface of the bushing 126. Bearing set 130 abuts against the retainer ring 148 and is therefore held in position via abutment against ridge 132 and retainer ring 148. This overall arrangement also maintains the bushing within the central opening 124 of the pulley wheel 122.

The idler pulley wheel assembly 120 therefore provides an integrally formed unit which can be placed onto and removed from the shaft 102 easily. In this regard, an inner surface 150 of the bushing 126 which defines the shaft receiving opening of the assembly 120 includes an inwardly extending shoulder 152 which contacts a corresponding shoulder 154 in the outer surface of the shaft 102 for limiting movement of the assembly 120 onto the shaft 102 so as to maintain the assembly near the end 106 of the shaft. Similarly, the shaft 102 may include an outwardly extending shoulder 156 which also aids in the proper positioning of the wheel assembly 120. The pulley wheel 122 is rotatable relative to the bushing 126 and when tension is placed on the band saw blade which extends around wheel 122, the inner surface 150 of the bushing 126 contacts the outer surface of the shaft 102 with sufficient friction force to prevent relative rotation between the bushing 126 and the shaft 102.

Figure 4:
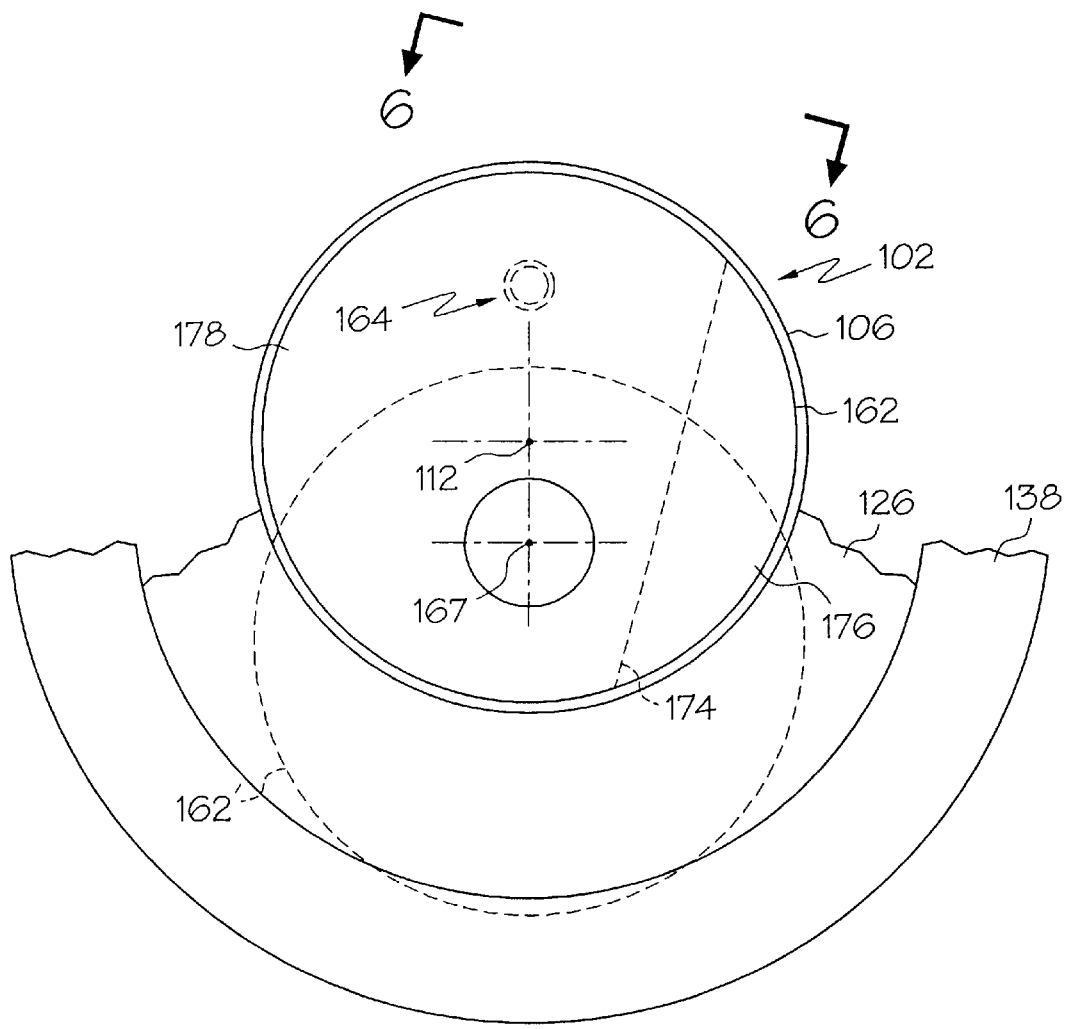
FIG. 4 is a side end view of the arrangement of FIG. 3.

In order to provide quick-release of the wheel assembly 120 from the shaft 102, a latch mechanism 160 is provided on the end 106 of the shaft. In particular, the latch mechanism 160 includes a movable latch part 162 and a catch 164. The latch part 162 is preferably rotatably mounted to the end of the shaft 102 via a shoulder screw 166. As seen in the partial end view of FIG. 4, the latch part 162 may be shaped to coincide with the outer perimeter of the end 106 of the shaft 102 when in the illustrated non-latching state. The axis of rotation 167 of the latch part 162 is offset from the central axis 112 of the shaft 102 to permit the latch part 162 to be rotated into a latching state (illustrated as dashed outline 162') in which at least a portion of the latch part 162 extends beyond the outer surface of the shaft 102 sufficiently far to overlap with a portion of the wheel assembly 120 to thereby prevent the wheel assembly 120 from being pulled off the end of the shaft. When in the latching state 162' the latch part 162 preferably overlaps at least a portion of the wheel assembly such as bushing 126 and retainer plate 138. The latch part 162 may preferably be formed of a suitable metal material such as stainless steel, although other materials could be utilized.

Figure 5:
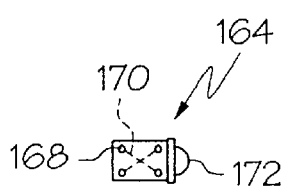
FIG. 5 is a side view of a catch member.
Figure 6:
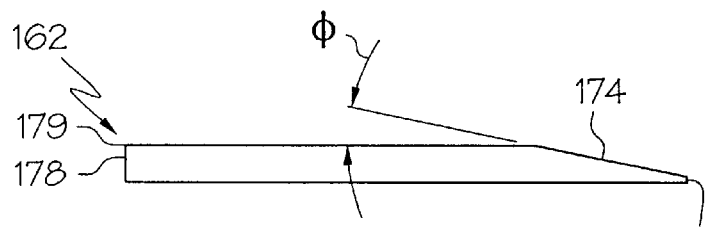
FIG. 6 is a view along line 6—6 of FIG. 4.

The catch 164 is configured to frictionally engage the latch part 162 when the latch part 162 is positioned in the non-latching state so as to enable simple removal and installation of the wheel assembly 120 relative to the shaft 102. In this regard, the catch 164 preferably comprises a spring-loaded member mounted into the end 106 of the shaft 102. An exemplary catch 164 includes a housing 168, internal spring 170 and outwardly biased ball member 172 (FIG. 5). In order to facilitate desired rotation of the latch part 162 relative to the catch 164, the inner surface of the latch part 162 is provided with a beveled edge or ramp 174. The ramp 174 is positioned at side 176 of the latch part so that the latch part 162 can be easily rotated from a latching state 162' over the catch 164 in a clockwise direction relative to the end view of FIG. 4 without having to manually push the catch 164. In other words, rotation of the latch part 162 itself pushes the catch 164 inward as the ramp 174 engages the catch 164. The clockwise direction is chosen assuming that the wheel assembly 120 rotates in a counter-clockwise direction. The opposite side 178 of the latch part 162 is intentionally formed without a ramp so as to form a shoulder 179 to aid in preventing the latch part 162 from moving over the catch 164 when rotated from the latching-state 162' in a counter-clockwise manner, as the latch part 162 may have a natural tendency to rotate in the counter-clockwise direction when the wheel assembly 120 rotates in the counter-clockwise direction. As best seen in the side view of FIG. 6, the ramp 174 forms an angle with the inner surface of latch part 162. Angle $\phi$ is preferably in the range of 15° to 45°, although variations are possible.

It is recognized that where the wheel assembly rotates in a clockwise direction, the position of the ramp on the latch part 162 would preferably be switched to side 178. It is also recognized that a catch could be provided for holding the latch part 162 in the latching state. Further, it is recognized that depending upon the configuration of the latch part 162, the catch 164 may also engage and hold the latch part 162 while it is in one of many positions which defme latching states.

The arrangement provides for an idler pulley wheel assembly which is quickly and easily removable for cleaning, maintenance and replacement. Although the invention has been described and illustrated in detail it is to be clearly understood that the same is intended by way of illustration and example only and is not intended to be taken by way of limitation. Accordingly, the spirit and scope of the invention are to be limited only by the terms of the appended claims.

What is claimed is:

1. A band saw apparatus, comprising:
   a frame;
   a driving pulley wheel mounted on the frame;

an idler shaft extending from the frame and spaced from the driving pulley wheel, the shaft fixed in a non-rotatable state;

an idler pulley wheel assembly positioned on the shaft for rotation relative thereto; and a latch mechanism mounted on an end of the shaft and including a latch part rotatably connected to the end of the shaft and movable between a first position defining a latching state of the mechanism in which a portion of the latch part extends beyond an outer surface of the shaft and a second position defining a non-latching state of the mechanism in which the latch part is positioned entirely within or in substantial alignment with the outer surface of the shaft, wherein the idler pulley wheel assembly can be slid off the end of the shaft when the latch mechanism is in the non-latching state.

2. An idler pulley wheel arrangement for a bandsaw, comprising:

a non-rotating idler shaft;

an idler pulley wheel assembly positioned on the shaft, wherein the idler pulley wheel assembly includes a pulley wheel with a central opening, a bushing positioned within the central opening, and bearings positioned between an outer surface of the bushing and an inner surface of the pulley wheel, the inner surface of the pulley wheel defining the central opening of the pulley wheel, wherein the pulley wheel is rotatable relative to the bushing and an inner surface of the bushing contacts an outer surface of the shaft for preventing relative rotation therebetween; and a latch mechanism mounted on an end of the shaft and including a latch part connected to the end of the shaft for movement between a first position defining a latching state of the mechanism in which a portion of the latch part extends beyond an outer surface of the shaft and a second position defining a non-latching state of the mechanism in which the latch part is positioned entirely within or in substantial alignment with the outer surface of the shaft, wherein the idler pulley wheel assembly can be slid off the end of the shaft when the latch mechanism is in the non-latching state.

3. The arrangement of claim 2 wherein the latch mechanism further includes a catch positioned on the end of the shaft for holding the latch part in one of the non-latching state and the latching state.

4. An idler pulley wheel arrangement for a bandsaw, comprising:

a non-rotating idler shaft;

an idler pulley wheel assembly positioned on the shaft for rotation relative thereto; and a latch mechanism positioned on an end of the shaft and including a latch part movably connected to the end of the shaft for movement between a first position defining a latching state of the mechanism in which a portion of the latch part extends beyond an outer surface of the shaft and a second position defining a non-latching state of the mechanism in which the latch part is positioned entirely within or in substantial alignment with the outer surface of the shaft, the latch mechanism further including a catch positioned on the end of the shaft for holding the latch part in the non-latching state, wherein the idler pulley wheel assembly can be slid off the end of the shaft when the latch mechanism is in the non-latching state.

5. The arrangement of claim 4 wherein the idler pulley wheel assembly includes a pulley wheel with a central opening, a bushing positioned within the central opening, bearings positioned between an outer surface of the bushing and an inner surface of the pulley wheel, the inner surface of the pulley wheel defining the central opening of the pulley wheel.

6. The arrangement of claim 5 wherein the inner surface of the pulley wheel includes an inwardly extending ridge, the bearings include a first bearing set positioned adjacent a first side of the ridge and a second bearing set positioned adjacent a second side of the ridge.

7. The arrangement of claim 6 wherein the idler pulley wheel assembly farther includes a first retainer plate positioned on a first side of the pulley wheel and partially covering the central opening of the pulley wheel, a second retainer plate positioned on a second side of the pulley wheel and partially covering the central opening of the pulley wheel, a first bearing seal positioned between the first bearing set and the first retainer plate, and a second bearing seal positioned between the second bearing set and the second retainer plate.

8. The arrangement of claim 7 wherein the outer surface of the bushing includes a shoulder located to the first side of the ridge and a radially inner portion of the first bearing set contacts the shoulder, the outer surface of the bushing including a groove located to the second side of the ridge with a retaining ring positioned in the groove and extending therefrom, a radially inner portion of the second bearing set contacting the retaining ring.

9. The arrangement of claim 5 wherein the pulley wheel is rotatable relative to the bushing and an inner surface of the bushing contacts an outer surface of the shaft for preventing relative rotation therebetween.

10. The arrangement of claim 5 wherein a radially inner surface of the bushing includes a shoulder for positioning adjacent a shoulder near the end of the shaft for maintaining the idler wheel assembly adjacent the end of the shaft.

11. The arrangement of claim 4 wherein the latch part is rotatably connected to the end of the shaft and a center of rotation of the latch part is offset from a central axis of the shaft.

12. The arrangement of claim 11 wherein the catch is spring loaded into the end of the shaft for being biased outwardly from the end of the shaft, the catch being in a first position when the latch mechanism is in the latching state and in a second position when the latch mechanism is in the non-latching state, the catch extending further outward from the end of the shaft when in the first position than when in the second position.

13. The arrangement of claim 12 wherein a first side portion of the latch part includes a ramp for facilitating movement of the latch part over the catch as the mechanism is changed from the latching state to the non-latching state by rotating the latch part in a first direction.

14. The arrangement of claim 13 wherein a second side portion of the latch part includes a shoulder for preventing the latch part from moving over the catch when the latch part is rotated from the latching state in a second direction opposite the first direction.

15. An idler pulley wheel arrangement installable on a non-rotating idler shaft of a bandsaw, comprising:

an idler pulley wheel assembly, wherein the idler pulley wheel assembly includes a pulley wheel with a central opening, a bushing positioned within the central opening, and bearings positioned between an outer surface of the bushing and an inner surface of the pulley wheel, the inner surface of the pulley wheel defining the central opening of the pulley wheel, wherein the pulley wheel is rotatable relative to the bushing and an inner surface of the bushing is sized to contact an outer surface of the shaft for preventing relative rotation therebetween.

16. The arrangement of claim 15 wherein the inner surface of the pulley wheel includes an inwardly extending ridge, the bearings include a first bearing set positioned adjacent a first side of the ridge and a second bearing set positioned adjacent a second side of the ridge, wherein the idler pulley wheel assembly further includes a first retainer plate positioned on a first side of the pulley wheel and partially covering the central opening of the pulley wheel, a second retainer plate positioned on a second side of the pulley wheel and partially covering the central opening of the pulley wheel, a first bearing seal positioned between the first bearing set and the first retainer plate, and a second bearing seal positioned between the second bearing set and the second retainer plate.

17. The arrangement of claim 16 wherein the outer surface of the bushing includes a shoulder located to the first side of the ridge, a radially inner portion of the first bearing set contacting the shoulder, a groove located to the second side of the ridge, a retaining ring positioned in the groove and extending therefrom, a radially inner portion of the second bearing set contacting the retaining ring.

18. The arrangement of claim 15 wherein a radially inner surface of the bushing includes a shoulder for positioning adjacent a shoulder of the shaft.

* * * * *